United States Patent [19] [11] 4,157,265
Papenfuhs et al. [45] Jun. 5, 1979

[54] WATER-INSOLUBLE DISAZOMETHINE MIXED METAL-COMPLEX COMPOUNDS, PROCESS FOR PREPARING THEM AND THEIR USE AS COLORANTS

[75] Inventors: Theodor Papenfuhs, Frankfurt am Main; Heinrich Volk, Bad Vilbel, both of Fed. Rep. of Germany

[73] Assignee: Hoechst Aktiengesellschaft, Frankfurt am Main, Fed. Rep. of Germany

[21] Appl. No.: 873,598

[22] Filed: Jan. 30, 1978

Related U.S. Application Data

[63] Continuation of Ser. No. 775,795, Mar. 9, 1977, abandoned.

[30] Foreign Application Priority Data

Mar. 12, 1976 [DE] Fed. Rep. of Germany ....... 2610308

[51] Int. Cl.² .......................... C07F 15/04; C07F 1/08
[52] U.S. Cl. ............................ 106/288 Q; 260/429 C; 260/429 R; 106/22
[58] Field of Search ............... 106/288 Q; 260/429 C, 260/429 R

[56] References Cited

U.S. PATENT DOCUMENTS

| | | | |
|---|---|---|---|
| 3,457,301 | 7/1969 | Lenoir et al. ..................... | 106/288 Q |
| 3,864,371 | 2/1975 | Inman et al. ..................... | 106/288 Q |
| 3,895,041 | 7/1975 | Inman et al. ..................... | 106/288 Q |
| 3,939,194 | 2/1976 | L'Eplattenier et al. ......... | 106/288 Q |
| 4,008,225 | 2/1977 | L'Eplattenier et al. ......... | 260/429 C |

*Primary Examiner*—Patrick Garvin
*Assistant Examiner*—J. V. Howard
*Attorney, Agent, or Firm*—Connolly and Hutz

[57] ABSTRACT

New valuable, water-insoluble mixed diaminophenylenedisazomethine-naphthalene metal-complex compounds had been found consisting of two or more metal-complex disazomethine compounds of different constitution or different metal complexes which are prepared according to this invention by reacting one or several o-phenylene diamines with one or several hydroxy-naphthaldehydes at which process metallization is carried out by addition of one or several metal-yielding agents of one or several different metals before, during or after the condensation reaction of the amino and aldehyde compounds.

The new mixed metal-complex compounds are suitable as colorants, especially as pigments for the coloring of printing pastes, printing inks, high-molecular plastic masses, lacquers, paints and spinning masses which colored materials possess very good fastness properties to, for example, light, to weather, to solvents or to migration, and the colorants themselves possess an excellent fastness to heat and have a high tinctorial strength, a good transparency, a good dispersability and, in general, pure shades.

13 Claims, No Drawings

WATER-INSOLUBLE DISAZOMETHINE MIXED METAL-COMPLEX COMPOUNDS, PROCESS FOR PREPARING THEM AND THEIR USE AS COLORANTS

This application is a continuation of application Ser. No. 775,795 filed Mar. 9, 1977 now abandoned.

Novel mixed metal-complex compounds have been found which consist of at least two, for example two, three, four or five, especially two, three or four, preferably two or four of the compounds of the general formula (I)

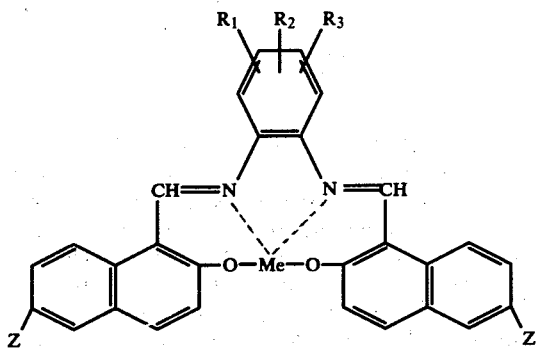

wherein each Z which may be identical or different from one another, represents hydrogen, halogen, such as fluorine, chlorine, bromine, lower alkoxy, preferably one having 1 to 4 carbon atoms, a nitro or cyano group, Me is a bivalent metal atom, preferably nickel, copper, cobalt, zinc, cadmium or manganese, especially nickel or copper $R_1$ is hydrogen, halogen, such as chlorine, bromine, fluorine, lower alkoxy, preferably one having 1 to 4 carbon atoms, phenoxy group, a phenoxy group substituted by substituents, preferably one or two substituents selected from the group halogen, such as chlorine or bromine, lower alkyl and lower alkoxy, a hydroxy, cyano, trifluoromethyl, carboxy, lower carboxylic acid alkyl ester group, preferably one having 1 to 4 carbon atoms in the alkyl moiety, a lower alkanoyl group, preferably one having 1 to 4 carbon atoms in the alkyl moiety, a benzoyl group or a benzoyl group substituted by substituents, preferably 1 or 2 substituents selected from the group halogen, lower alkyl and lower alkoxy, $R_2$ is hydrogen, halogen, such as chlorine, bromine, fluorine, lower alkoxy, preferably one having 1 to 4 carbon atoms, lower alkyl, preferably one having 1 to 4 carbon atoms, a phenoxy group, a phenoxy group substituted by substituents, preferably 1 or 2 substituents selected from the group halogen, lower alkyl and lower alkoxy, a hydroxy, cyano, trifluoromethyl, carboxy, lower carboxylic acid alkyl ester group, preferably one having 1 to 4 carbon atoms in the alkyl moiety, a lower alkanoyl group, preferably one having 1 to 4 carbon atoms in the alkyl moiety, a benzoyl group or a benzoyl group substituted by substituents, preferably 1 or 2 substituents selected from the group halogen, lower alkyl and lower alkoxy and $R_3$ is hydrogen, halogen, such as chlorine, bromine, fluorine, a lower alkoxy group, preferably one having 1 to 4 carbon atoms, or a lower alkyl group, preferably one having 1 to 4 carbon atoms.

Mixed metal-complex compounds consisting of one or several such as 1, 2 or 3 or 4 metal-complex compounds of the above formula I having, preferably one or two, components, wherein $R_1=R_2=R_3=$hydrogen, and having, preferably one or two, components wherein at least one substituent, i.e. one or two, of the series $R_1$, $R_2$ and $R_3$ is no hydrogen atom, are preferred.

Among these last-mentioned preferred metal-mixed complexes there may especially be mentioned those which contain as components of the formula (I) besides the one or several such as 1, 2 or 3 compounds wherein $R_1=R_2=R_3$ is hydrogen, one or several, such as 1, 2 or 3, substituted metal complex disazomethine compounds of the formula (I), wherein $R_1$ stands for hydrogen, $R_2$ for chlorine or bromine or an alkyl group having 1 to 4 carbon atoms, an alkoxy group having 1 to 4 carbon atoms, a phenoxy group which may be substituted by 1 or 2 substituents selected from the group halogen, such as chlorine or bromine, lower alkyl and lower alkoxy, a hydroxy group, cyano, trifluoromethyl, carboxy or carboxylic acid alkyl ester group having 1 to 4 carbon atoms and $R_3$ stands for hydrogen or chlorine or bromine or an alkyl group having 1 to 4 carbon atoms or an alkoxy group having 1 to 4 carbon atoms, as well as each Z, identical or different, represents hydrogen, chlorine or bromine atom, a methoxy, ethoxy, propoxy, nitro or cyano group.

Those mixed metal-complex compounds thereof are preferred which contain in total 10 to 50 mol % of one or several such as 1, 2 or 3, compounds of the formula (I) as mixed complex compounds, wherein at least one, i.e. one or two of the substitutents $R_1$, $R_2$, $R_3$ is not identical to hydrogen, and Me and Z are defined above.

Among the mixed complex compounds consisting of one or several, such as 1, 2 or 3 or 4 components of the above formula (I) with $R_1=R_2=R_3$ representing hydrogen, there are furthermore preferred those the portion of which of one or several such as 1 or 2 or 3, nickel complex compounds is not more than 95 mol%, preferably 60 to 95, especially 60 to 92 mol%.

Among the above-mentioned mixed complexes there are especially preferred those which contain beside one or several, preferably one or two components with $R_1=R_2=R_3$ identical to hydrogen especially with different metal atoms, also contain one or several, preferably one or two components having especially different metal atoms but having identical structure with regard to the substituents in the phenylene and naphthylene radicals, in which $R_1$ is hydrogen, halogen, preferably chlorine or bromine, alkyl having 1 to 3 carbon atoms, alkoxy having 1 to 3 carbon atoms, a hydroxy, carboxy or carboxylic acid alkyl ester group having 1 to 4 carbon atoms in the alkyl moiety, $R_2$ is hydrogen, halogen, preferably chlorine or bromine, alkyl having 1 to 3 carbon atoms, alkoxy having 1 to 3 carbon atoms, a hydroxy, carboxy or carboxylic acid alkyl ester group having 1 to 4 carbon atoms in the alkyl moiety, and $R_3$ is hydrogen, halogen, preferably chlorine or bromine, alkyl having 1 to 3 carbon atoms or alkoxy having 1 to 3 carbon atoms, wherein at least one of the substituents $R_1$, $R_2$ and $R_3$ is not identical to hydrogen.

Very interesting are also mixed complex compounds of the general formula (Ia)

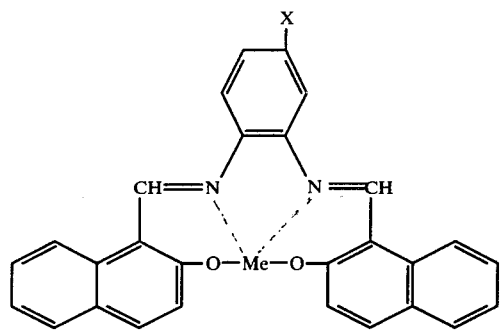

(Ia)

wherein X is hydrogen or halogen, such as chlorine or bromine, or an alkoxy group having 1 to 4 carbon atoms, especially a methoxy or ethoxy group, and Me stands for nickel or copper, the portion of mixed complex components with X identical to hydrogen being in total between 60 and 95 mol% and the portion of mixed complex component(s) with Me identical to Nickel being in total between 100 to 85 mol%.

Especially interesting are mixed complexes which consist of, in total, 90 to 60 mol% one, two or three, nickel complex components of the formula (I) wherein $R_1=R_2=R_3$=hydrogen, and of, in total, 10 to 40 mol% of one, two or three nickel complex compounds of the formula (I) wherein $R_1$ is hydrogen, halogen, preferably chlorine or bromine, an alkyl group having 1 to 3 carbon atoms, alkoxy having 1 to 3 carbon atoms, a hydroxy, carboxy or carboxylic acid alkyl ester group having 1 to 4 carbon atoms in the alkyl moiety $R_2$ is hydrogen, halogen, preferably chlorine or bromine, an alkyl group having 1 to 3 carbon atoms, an alkoxy group having 1 to 3 carbon atoms, a hydroxy, carboxy or carboxylic acid alkyl ester group having 1 to 4 carbon atoms, in the alkyl moiety, and $R_3$ is hydrogen, halogen, preferably chlorine or bromine, alkyl having 1 to 3 carbon atoms or an alkoxy group having 1 to 3 carbon atoms, wherein at least one of the substituents $R_1$, $R_2$ and $R_3$ are not identical to hydrogen.

There are furthermore interesting mixed complexes consisting of one or several, such as 1,2 or 3 or 4 compounds of the formula (I), wherein $R_1=R_2=R_3$ represents hydrogen, with a portion of 95 to 60 mol% of one or several, such as 1, 2 or 3, nickel complex compounds and of 5 to 40 mol% of one or several such as 1, 2 or 3 copper complex compounds.

Among all the above mentioned mixed complex compounds those are preferred which contain as components compounds of the formula (I) in which each Z, identical or different, stands for hydrogen, bromine or methoxy; especially, among all the abovementioned mixed complex compounds are preferred in which each Z is hydrogen.

The mixed complex compounds of the invention are available in most cases as mixed crystals, but they are no mechanical mixtures of individual compounds of the formula (I).

The novel mixed complex compounds may be obtained in usual manner by condensing in mixture with one another 2 mols of one aldehyde of the formula (II)

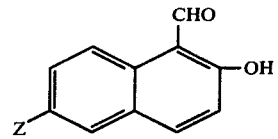

(II)

or, on the whole, 2 mols of two or several aldehydes of the formula (II) wherein Z has the above meaning with 1 mol of an o-phenylene-diamine of the formula (III)

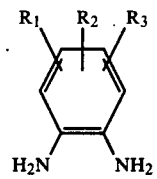

(III)

or with, on the whole, 1 mol of two or several diamines of the formula (III) wherein $R_1$, $R_2$ and $R_3$ have the above meanings, and treating the disazomethine compound obtained,—if starting from uniform reactants (II) and (III) in each case,—during the condensation reaction or subsequently with metallizing agents of two or several different metals Me having the above meaning, or treating the disazomethine compounds mixture obtained, if starting from reactants (II) and (III) at least one of which consting of at least two compounds, during the condensation reaction or subsequently with one or several metallizing agents of one or two or several different metals Me of the above meaning.

The novel mixed complex compounds of the present invention may also be prepared by reducing one or several o-nitroanilines of the formula (IV)

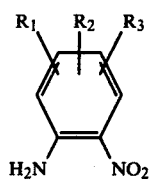

(IV)

wherein $R_1$, $R_2$ and $R_3$ have the above meaning, according to usual methods and reacting the diamine compound of the formula (III) or their mixtures obtained without intermediate isolation with one or several hydroxynaphthaldehyde compounds of the formula (II) in a molar ratio of 1:2 and metallizing according to the above-mentioned preparation process.

Aldehydes of the formula (II) are especially those in which Z is hydrogen, chlorine or bromine, a methoxy, ethoxy or propoxy group, a nitro or cyano group. They may be obtained in known manner by formylation of the corresponding 2-hydroxynaphthalenes, especially according to the method of Duff.

Diamines of the formula (III) are especially those in which the benzene nucleus is substituted by at least one halogen atom, for example one or two chlorine or bromine atoms, one or two lower alkyl groups having 1 to 4 carbon atoms, such as methyl, ethyl, propyl or butyl groups, one or two lower alkoxy groups having 1 to 4 carbon atoms, such as methoxy, ethoxy, propoxy or butoxy groups, a phenoxy group, which may be substituted by halogen atoms, lower alkyl and/or alkoxy groups, a hydroxy group, a cyano group, a trifluoromethyl, carboxy or lower carboxylic acid alkyl ester group such as a methyl, ethyl, propyl or butyl ester group.

The condensation of the aldehyde(s) with the diamine mixture is expediently carried out in water or in an organic solvent at an elevated temperature, preferably between about 60° C. and the boiling point of the solvent used. There are especially considered as solvents: water, ethanol, glacial acetic acid, dimethylformamide, N-methylpyrrolidone, glycolmono- or -dimethylether, xylene or the mixtures thereof.

The disazomethine mixtures obtained are difficultly soluble in the solvents mentioned and may be easily isolated by filtration. Possible contaminations may be removed by washing out. In order to convert the disazomethine mixtures obtained into the mixed complex compounds of the invention the metal-free compounds are treated with compounds or mixtures of compounds which yield two-valent metal, for example with salts of nickel, copper, cobalt, zinc, cadmium or manganese, preferably the formiates or acetates thereof.

The complexation of a disazomethine of the formula (V)

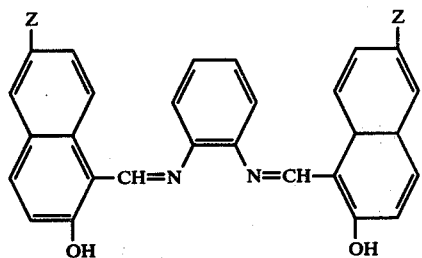

wherein Z has the above meaning is preferably effected with a mixture of metal-yielding agents of imperatively up to 5 mol% of a metal different from nickel, thus with metal-yielding agents which contain metal-yielding reagents of one or several metals Me of the above meaning different from nickel, i.e. contain at most 95 mol% of a nickel-yielding agent.

Metallization is expediently carried out in one of the above-mentioned solvents or in a mixture thereof.

Metallization may also be carried out before or, as already mentioned, simultaneously with the azomethine condensation, by treating the aldehyde first individually with a metal-yielding agent in one of the above solvents or in a mixture thereof and then condensing with the diamine, or condensing the aldehyde together with the diamine in the presence of the metal-yielding agents in the solvents mentioned.

The novel mixed complex compounds have proved to be very good coloring agents and represent especially good pigments which are suitable, especially after a conditioning usual for pigments, for example for the dyeing of plastic masses (which are masses of plastics or synthetic resins free from solvents or containing solvents or free from softening agents or containing softening agents). Furthermore for the pigmentation of paints on an oily or aqueous base as well as of different lacquers, for the dyeing of viscose and cellulose acetate or for the pigmentation of polyethylene, polystyrene, polyvinyl chloride, rubber and synthetic leather, but which may be preferably used for the preparation of metal effect lacquers.

They may also be used in printing inks for graphic industry, for the coloring of the paper mass, for coating textiles or for the pigment print. The colourings obtained have an excellent fastness to migration overvarnishing bleeding to light, to weather and to solvents, they have an excellent fastness to heat and are characterized by a high tinctorial strength, a good transparency, a good dispersability and often surprisingly pure shades.

In contradistinction to the next comparable known individual compounds of the above formula I wherein $R_1=R_2=R_3=$ hydrogen or one of these substituents is a nitro, carboxylic acid amide or sulfonic acid amide group (cf. German Offenlegungsschrift No. 2,308,594, German Offenlegungsschrift No. 2,007,844 and French Patent Specification No. 1,416,293), the mixed complex compounds of the instant invention are characterized by a better fastness to migration and to solvents, for example an improved fastness to bleeding and overvarnishing, by an elevated transparency and a better dispersability as well as especially a higher tinctorial strength and a pure shade.

Especially with regard to the next comparable pigment corresponding to the above formula I with $R_1=R_2=R_3=$ hydrogen, Z identical to hydrogen and Me identical to nickel (cf. German Offenlegungsschrift No. 2,308,594), a considerably improved fastness to overvarnishing, a considerably elevated tinctorial strength and a purer, more yellow shade of the mixed complex pigments has surprisingly been found, which could not be forseen with regard to the formation of the mixed complex.

For a crystal structure has been found for the mixed complex compounds of the present invention by X-ray diffraction according to Debye - Scherrer which is surprisingly different from the known individual pigments of the formula I.

The following Examples serve to illustrate the invention and especially describe preferred mixed complex compounds and variants of the preparation processes mentioned. Parts and percentages are by weight.

EXAMPLE 1

A mixture of 51,6 parts of 2-hydroxy-1-naphthaldehyde, 48 parts of sodium acetate and 900 parts of water is ground for 15 minutes in a dispersing device ("dispergator") at room temperature. Then a solution of 46 parts of nickel sulfate in 150 parts of water is added, and the whole is dispersed for half an hour, the temperature increasing to 30°–40° C.

The finely divided suspension of the 2-hydroxy-1-naphthaldehyde nickel complex obtained is introduced into a threeneck flask (reflux cooler, stirrer, thermometer), and after addition of a mixture of 4,6 parts of 4-methyl-o-phenylene-diamine and 12,2 parts of o-phenylene-diamine, the whole is heated within 2 hours steadily to 95° C., in the course of which the pH value decreases from 7.8 to about 4.

The whole is then mixed with a solution of 48 parts of sodium acetate in 150 parts of water and stirring is continued for 150 minutes at boiling temperature; the mixture is filtered hot, washed with 4000 parts of water and dried. 70.7 Parts (98.2% of the theory) of a mixed complex compound corresponding to the formula

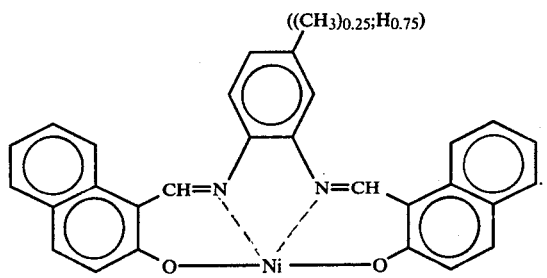

$((CH_3)_{0.25};H_{0.75})$ are obtained, which dyes plastics in yellowish red shades and may be used in an excellent manner for the preparation of lacquers fast to light and to weather, especially metal effect lacquers where it shows a high tinctorial strength and an excellent fastness to overvarnishing.

If the humid filter cake of the nickel complex is stirred with 5-times the amount of dimethylformamide for 5 hours at 100° C., which is then suction-filtered, washed with dimethylformamide and water and subsequent dried, an improved pigment is obtained which has a better covering power, a better dispersing capacity and a purer shade with otherwise comparable properties.

If the 4-methyl-o-phenylene-diamine is replaced by 3-methyl-p-phenylene-diamine, a pigment having comparable properties and fastness properties and a more bluish shade and a higher tinctorial strength is obtained with the same yield.

EXAMPLE 2 to 11

If instead of the mixture of o-phenylene-diamine and 4-methyl-o-phenylene-diamine per 2 mols of hydroxynaphthaldehyde n mols of an other substituted o-phenylene-diamine and 1-n mols of o-phenylene-diamine are added, and the operation is carried out as indicated in Example 1, there are also obtained mixed complex compounds of compounds of the formula Ia with the yields and shades listed in Table 1.

Table 1

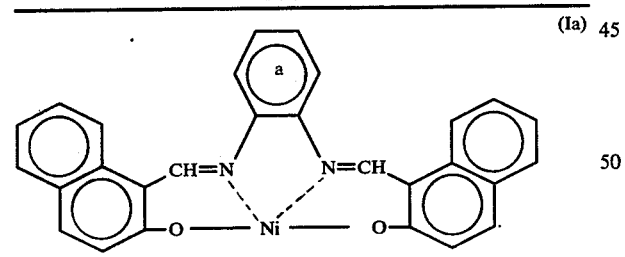

(Ia)

a = substituted or unsubstituted benzene nucleus
n = portion of substituted benzene nucleus a, calculated on 1.00
1−n = portion of unsubstituted benzene nucleus a

| Example | [a]n | n | yield | shade |
|---|---|---|---|---|
| 2 | Cl | 0.15 | 98.2% | scarlet |

Table 1-continued

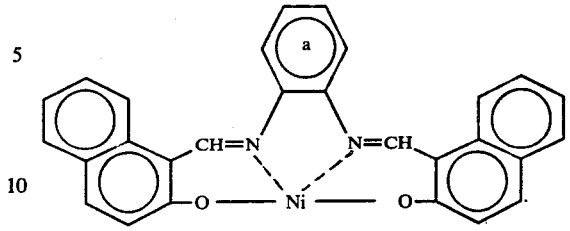

(Ia)

a = substituted or unsubstituted benzene nucleus
n = portion of substituted benzene nucleus a, calculated on 1.00
1−n = portion of unsubstituted benzene nucleus a

| Example | [a]n | n | yield | shade |
|---|---|---|---|---|
| 3 | Cl | 0.40 | 98.5% | red |
| 4 | H₃C, CH₃ | 0.05 | 94.8% | red orange |
| 5 | Cl, Cl | 0.10 | 99.0% | yellow-brown |
| 6 | COOH | 0.10 | 96.8% | bordeau red |
| 7 | CH₃ | 0.60 | 90.3% | bluish red |
| 8 | OCH₃ | 0.20 | 95.2% | bordeau red |
| 9 | COOCH₃ | 0.20 | 97.2% | red |
| 10 | OH | 0.05 | 92.7% | bluish red |

Table 1-continued

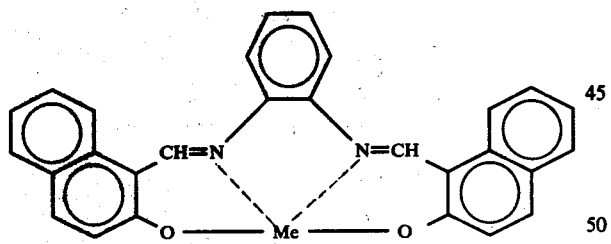

a = substituted or unsubstituted benzene nucleus
n = portion of substituted benzene nucleus a, calculated on 1.00
1−n = portion of unsubstituted benzene nucleus a

| Example | [a]ₙ | n | yield | shade |
|---|---|---|---|---|
| 11 | Cl, CH₃ (on benzene) | 0.15 | 98.0% | orange red |

EXAMPLE 12

A mixture of 51.6 parts of 2-hydroxy-1-naphthaldehyde, 16,2 parts of o-phenylene-diamine and 250 parts of dimethylformamide are heated for 3 hours at 100° C., then cooled. The orange deposit which has precipitated is suction-filtered, washed with dimethylformamide and then suspended in 600 parts of ethanol. The suspension is mixed with a mixture of 24.3 parts of nickel acetate and 2.85 parts of copper acetate, heated for 4 hours to be boil, suction-filtered hot, washed with hot ethanol, then with water and dried. 69.4 Parts (97.0% of the theory) of a bordo red compound of the formula

[structure with CH=N, N=CH, O—Me—O]

are obtained, wherein Me is identical to nickel and copper in the molar ratio of 9:1, which compound permits to prepare color-intense printing inks, and may especially be used in lacquers in an excellent manner, preferably in metal effect lacquers wherein it shows an excellent fastness to solvents, to light and to weather.

If the o-phenylene-diamine is replaced by aliquote amounts of 4-chloro-o-phenylene-diamine and the operation is otherwise carried out in the indicated manner, a slightly more yellow pigment is obtained in the same yield, which has comparably good properties.

EXAMPLE 13

A mixture of 17.2 parts of 2-hydroxy-1-naphthaldehyde, 8.77 parts of nickel acetate and 100 parts of glacial acetic acid is stirred for one hour at room temperature. The whole is mixed with a mixture of 4.32 parts of o-phenylenediamine and 1.77 parts of 4.5-dichloro-o-phenylene-diamine and heated for 4 hours to the boil. The precipitate formed is suction-filtered, washed with hot ethanol, then with water and dried at 80° C. 22.8 Parts (92.8% of the theory) of an orange mixed complex of the formula

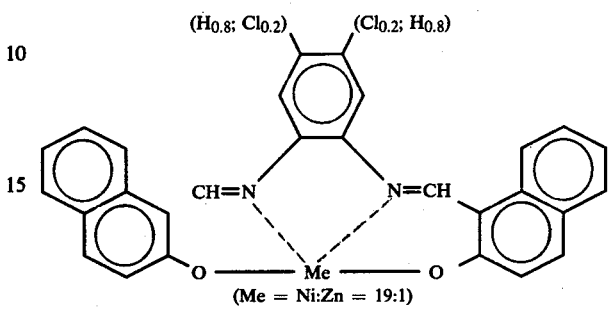

(Me = Ni:Zn = 19:1)

is obtained, which has good pigment properties and is especially suitable for the preparation of car lacquers having a high fastness to light and to weather.

Subsequently heating of the aqueous filter cake with 3-times the amount of N-methylpyrrolidone for 4 hours at 80°–90° C. provides a pigment having a purer shade and an improved dispersability.

If in Example 13 the 2-hydroxy-1-naphthaldehyde is replaced by corresponding amounts of 6-methoxy-2-hydroxy-1-naphthaldehyde and the operation is carried out in the manner indicated, a somewhat redder pigment having comparable fastness properties but a higher tinctorial strength is obtained.

EXAMPLE 14–21

If instead of the mixture of o-phenylene-diamine and 4,5-dichloro-o-phenylene-diamine of Example 13 n mols of the substituted o-phenylene-diamines listed in Table 2 and 1-n mol of o-phenylene-diamine are used and reacted in analogous manner with 2 mols of 2-hydroxy-1-naphthaldehyde and with aliquote amounts of the metal acetate mixtures indicated in Table 2, instead of the mixtures of nickel and zinc acetate of Example 13, and the operation is carried out according to Example 13, further mixed complex compounds are obtained from compounds of the above general formula Ia with the yields and shades listed in Table 2.

Table 2

| Example | n | [a]ₙ | Me | Yield | Shade |
|---|---|---|---|---|---|
| 14 | 0.33 | COCH₃ | Ni:Co 19:1 | 97.3% | bluish red |
| 15 | 0.15 | COOC₂H₅ | Ni:Cu 12:1 | 94.8% | yellowish red |
| 16 | 0.45 | Br | Ni:Co 4:1 | 99.1% | red brown |

Table 2-continued

| Example | n | [ring a]n | Me | Yield | Shade |
|---|---|---|---|---|---|
| 17 | 0.075 | O-phenyl (naphthyl-O-Ph) | Ni:Zn 15:1 | 97.8% | bordo red |
| 18 | 0.8 | O-(4-Cl-phenyl) | Cu:Zn 7:2 | 97.9% | bordo red |
| 19 | 0.30 | H₃C, OCH₃ | Co:Zn 10:1 | 94.0% | bluish red |
| 20 | 0.175 | Cl, COOCH₃ | Ni:Cu 20:1 | 98.2% | yellowish red |
| 21 | 0.175 | CH(CH₃)₂ | Ni:Cu 20:1 | 91.7% | red orange |

EXAMPLE 22

A mixture of 6.9 parts of o-nitraniline and 9.1 parts of 3-nitro-4-amino-benzoic acid are hydrogenated in 300 parts of isopropanol under the catalysis of Raney-Nickel. After taking up the theoretical amount of hydrogen, pressure is released, the catalyst is filtered off hot and is washed with 100 parts of warm glacial acetic acid. The combined filtered products are added to a solution of 34.4 parts of 2-hydroxy-1-naphthaldehyde in 100 parts of glacial acetic -cid and heated for 3 hours to the boiling point. Then it is suction-filtered and washed with hot isopropanol.

The metallization with nickel acetate according to Example 12 provides 48.9 parts (98.1% of the theory) of a red brown pigment which corresponds, as to their technical properties, to the pigment described in Example 6.

EXAMPLE 23

A mixture of 51.6 parts of 2-hydroxy-1-naphthaldehyde, 46 parts of nickel sulfate and 1000 parts of water are ground in a disk attrition mill on circulating by pumping, and during this process a temperature of from 20° to 30° C. is adjusted with the aid of a heat exchanger. During the whole reaction the apparatus is covered by a layer of nitrogen. A mixture of 11.34 parts of o-phenylene-diamine and 6.21 parts of 4-methoxy-o-phenylene-diamine is added, and the whole is heated in 2 hours to 60° C., in further two hours to 90° C. The bluish red deposit formed is suction-filtered hot, washed neutral with hot water and dried.

69.1 Parts (94.8% of the theory) of a mixed complex of the formula

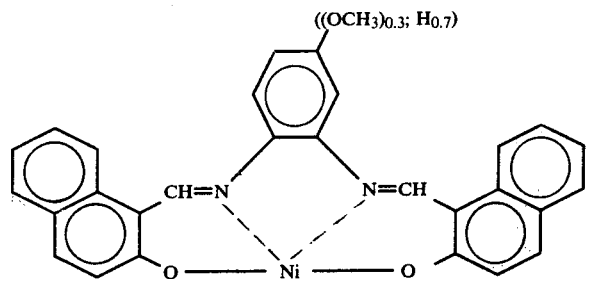

((OCH₃)₀.₃; H₀.₇)

are obtained which permits the preparation of especially color-intense lacquers, especially metal effect lacquers having an excellent fastness to light and to weather.

EXAMPLES 24–33

If in Example 23 the mixture of the o-phenylene-diamines is replaced by n mols of the substituted phenylene diamines indicated in Table 3 and 1-n mol of o-phenylene-diamine and the 2-molar amounts of 2-hydroxynaphthaldehyde, and the operation is carried out in analogous manner as indicated in Example 23 or in one of the other preceeding Examples mixed complexes of compounds of the above formula Ia, as indicated in Table 3, with the yields and shades listed in Table 3 are also obtained.

Table 3

| Example | [ring a]n | n | Yield | shade |
|---|---|---|---|---|
| 24 | Cl | 0.40 | 99.1% | scarlet |
| 25 | COOC₄H₉ | 0.05 | 97.8% | red |
| 26 | C₂H₅ | 0.20 | 97.3% | yellowish red |
| 27 | Cl (phenyl-Cl) | 0.20 | 98.3% | bluish red |
| 28 | CO-phenyl | 0.15 | 99.3% | bordo red |
| 29 | O-(phenyl-CH₃) | 0.05 | 98.7% | bordo red |
| 30 | Cl, OC₂H₅ | 0.10 | 96.8% | scarlet |

Table 3-continued

| Example | [benzene ring with substituents]n | n | Yield | shade |
|---------|------|------|-------|-------|
| 31 | H₃C, CH₃ | 0.65 | 94.9% | red orange |
| 32 | H₃C, CH₃ | 0.15 | 95.1% | red |
| 33 | Cl | 0.25 | 98.9% | scarlet |

The mixed complex compounds of Examples 1, 2, 5, 12 and 33 are especially preferred.

We claim:

1. A mixed metal-complex consisting of at least two compounds of the general formula (I)

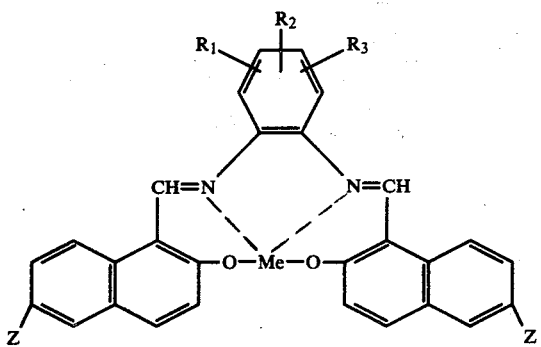

wherein each Z, which may be identical or different from one another, is hydrogen, halogen, lower alkoxy, nitro or cyano, Me stands for a bivalent metal atom, $R_1$ is hydrogen, halogen, lower alkoxy, lower alkyl, phenoxy unsubstituted or substituted by substituents selected from the group halogen, lower alkyl and lower alkoxy, or is hydroxy, cyano, trifluoromethyl, carboxy, lower carboxylic acid alkyl ester, lower alkanoyl benzoyl, benzoyl substituted by substitutents selected from the group halogen, lower alkyl and alkoxy, $R_2$ is hydrogen, halogen, lower alkoxy, lower alkyl, phenoxy, phenoxy substituted by substituents selected from the group halogen, lower alkyl and lower alkoxy, or is hydroxy, cyano, trifluoromethyl, carboxy, lower carboxylic acid alkyl ester, lower alkanoyl, benzoyl, benzoyl substituted by substituents selected from the group halogen, lower alkyl and lower alkoxy, and $R_3$ is hydrogen, halogen, lower alkoxy or lower alkyl.

2. A mixed complex as claimed in claim 1, consisting of one or several metal complex compounds of the formula (I) wherein $R_1=R_2=R_3=$hydrogen, and of one or several mixed metal complex compounds, wherein at least one substituent of the series of $R_1$, $R_2$ and $R_3$ does not represent hydrogen and Me and Z are defined as in claim 1.

3. A mixed complex as claimed in claim 1, consisting or one or several metal complex compounds of the formula (I) in which $R_1=R_2=R_3=$hydrogen, and of one or several mixed metal-complex compounds, wherein $R_1$ is hydrogen, $R_2$ is chlorine or bromine or alkyl having 1 to 4 carbon atoms, alkoxy having 1 to 4 carbon atoms, phenoxy unsubstituted or substituted by substituents selected from the group halogen, such as chlorine or bromine, lower alkyl and lower alkoxy, or is hydroxy, cyano, trifluoromethyl, carboxy or carboxylic acid alkyl ester having 1 to 4 carbon atoms in the alkyl moiety and $R_3$ is hydrogen, chlorine, bromine, alkyl having 1 to 4 carbon atoms or alkoxy having 1 to 4 carbon atoms, and Z, identical or different, each is hydrogen, chlorine, bromine, methoxy, ethoxy, propoxy, nitro or cyano, and Me is defined as in claim 1.

4. A mixed complex as claimed in claim 1, containing 10 to 50 mol% of one or several compounds of the formula (I) in which at least one of the substituents $R_1$, $R_2$ and $R_3$ is not identical to hydrogen, and Me and Z are defined as in claim 1.

5. A mixed complex as claimed in claim 1, consisting of compounds of the formula (I), wherein $R_1=R_2=R_3=$hydrogen and Me and Z have the meanings indicated in claim 1, with a portion of 60 to 95 mol% of one or several nickel complex compounds.

6. A mixed complex as claimed in claim 5, in which Z is hydrogen.

7. A mixed complex as claimed in claim 1, consisting of mixed complex components of the formula

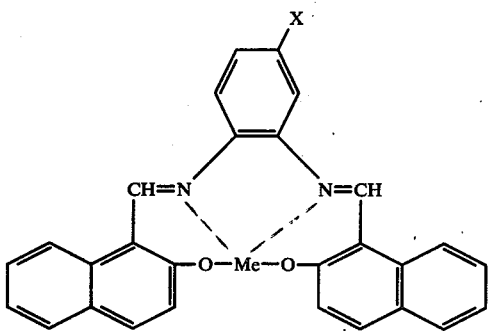

wherein X is hydrogen, halogen or alkoxy having 1 to 4 carbon atoms and Me is nickel or copper, with a portion of 60 to 95 mol% of one or two or three, mixed complex components wherein X is hydrogen, and a portion of 100 to 85 mol% of one or two or three mixed complex components wherein Me is nickel.

8. A mixed complex as claimed in claim 1, consisting of about 25 mol% of the compound of the formula

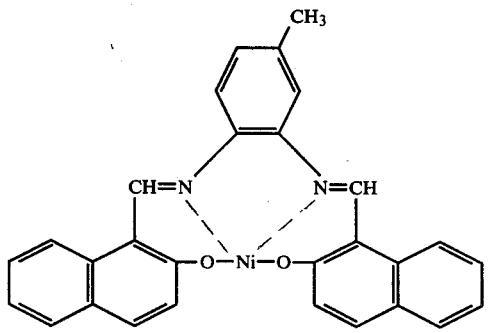

and about 75 mol% of the compound of the formula

9. A mixed complex as claimed in claim 1, consisting of about 15 mol% of the compound of the formula

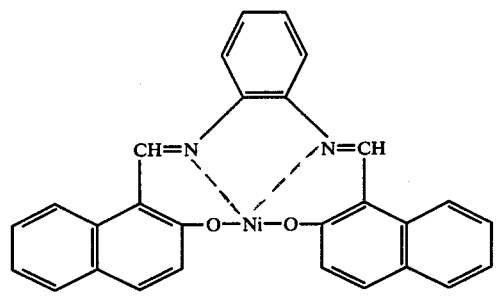

and about 85 mol% of the compound of the formula

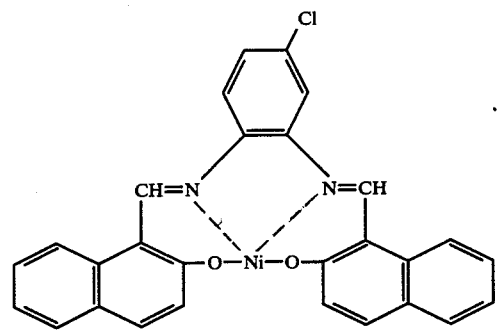

10. A mixed complex as claimed in claim 1, consisting of about 10 mol% of the compound of the formula

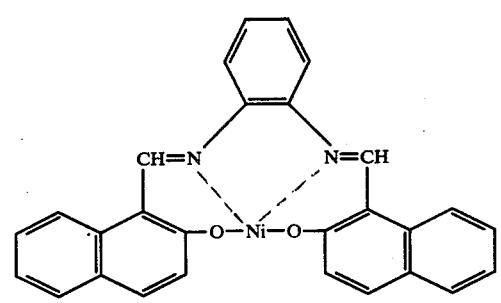

and about 90 mol% of the compound of the formula

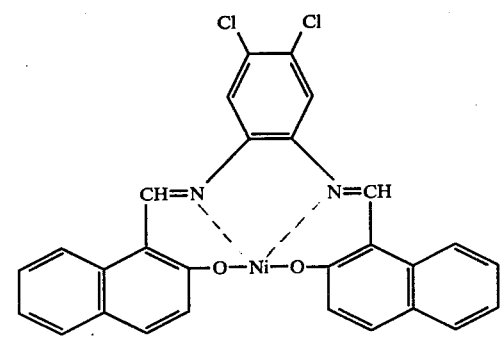

11. A mixed complex as claimed in claim 1, consisting of about 90 mol% of the compound of the formula

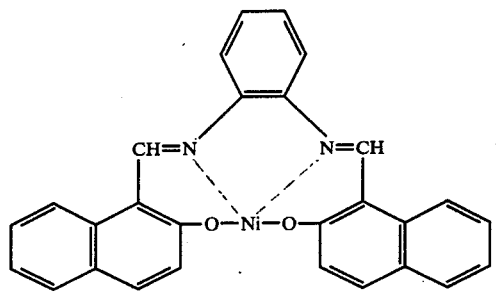

and about 10 mol% of the compound of the formula

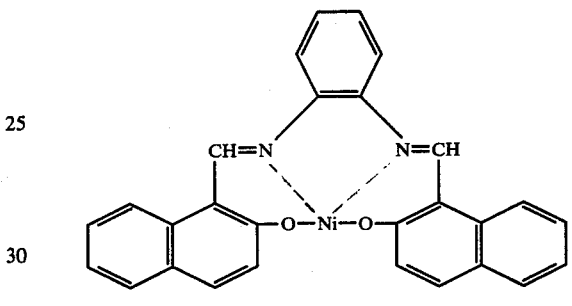

12. A mixed complex as claimed in claim 1, consisting of about 25 mol% of the compound of the formula

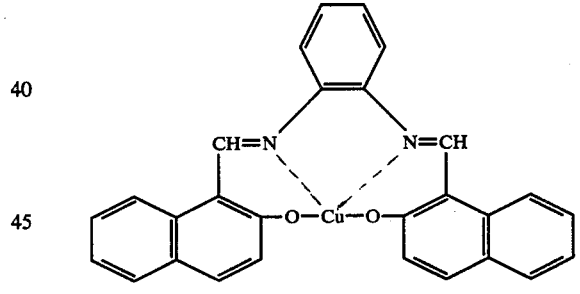

and about 75 mol% of the compound of the formula

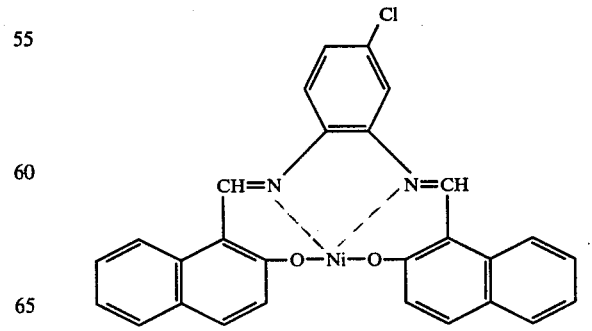

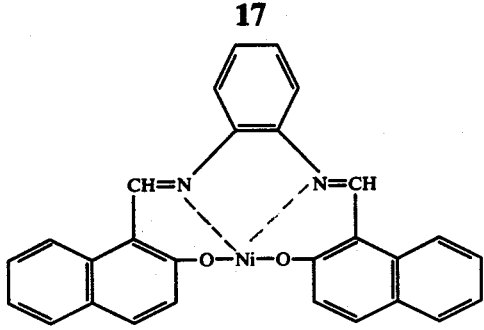
13. In a process for coloring a printing paste, a high-molecular plastic mass, a lacquer, a paint, a spinning mass or a printing ink wherein a colorant is incorporated, the improvement consisting of using as coloring agent a mixed metal-complex of claim 1.
* * * * *